United States Patent [19]

Oishi et al.

[11] 4,019,018
[45] Apr. 19, 1977

[54] PROCESS FOR NARROW GAP WELDING OF ALUMINUM ALLOY THICK PLATES

[75] Inventors: Minoru Oishi, Fujisawa; Masaharu Rokujo, Kobe; Hisaaki Yokota, Chigasaki; Naoki Okuda, Kamakura; Makoto Tomita, Yokohama; Toshihiko Endo, Kamakura, all of Japan

[73] Assignee: Kobe Steel Ltd., Kobe, Japan
[22] Filed: Jan. 29, 1975
[21] Appl. No.: 545,026

[30] Foreign Application Priority Data

Sept. 30, 1974 Japan ............................ 49-111476
Sept. 30, 1974 Japan ............................ 49-111477

[52] U.S. Cl. .............................. 219/137 R; 219/75
[51] Int. Cl.² ........................................ B23K 9/02
[58] Field of Search ............ 219/137 R, 75, 74, 72, 219/131 R

[56] References Cited

UNITED STATES PATENTS

| | | | |
|---|---|---|---|
| 3,374,335 | 3/1968 | Reesor et al. | 219/137 R |
| 3,549,857 | 12/1970 | Needham et al. | 219/131 R |
| 3,692,973 | 9/1972 | Oku et al. | 219/75 |
| 3,825,712 | 7/1974 | Gibbs | 219/137 R |

FOREIGN PATENTS OR APPLICATIONS 854,628  11/1960  United Kingdom ........... 219/137 R

OTHER PUBLICATIONS

D. D. Rager, "Direct Current, Straight Polarity Gas Tungsten–Arc Welding of Aluminum," Welding Journal, 5/1971, pp. 332–341.

Primary Examiner—Bruce A. Reynolds
Assistant Examiner—Clifford C. Shaw
Attorney, Agent, or Firm—Oblon, Fisher, Spivak, McClelland & Maier

[57] ABSTRACT

The narrow gap butt welding of aluminum and aluminum alloy plates of a thickness more than 20 mm with a non-consumable electrode is conducted by inserting a filling material into a welding groove, applying a direct current of more than 300 A between said non-consumable electrode which does not have a sharp end and said plates to be welded with straight polarity, maintaining an arc length from 0.5 to 5 mm and shielding the welding groove area with a shielding gas comprising at least 50% helium.

27 Claims, 26 Drawing Figures

PROCESS FOR NARROW GAP WELDING OF ALUMINUM ALLOY THICK PLATES

BACKGROUND OF THE INVENTION

1. Field of the Invention

The present invention relates to a non-consumable arc welding (hereinafter referred to as TIG welding) process. More particularly, the present invention relates to a process for the narrow gap butt welding of aluminum and aluminum alloy plates wherein a filling material is inserted into a welding groove and direct welding current with straight polarity is applied between a non-consumable electrode which does not have a sharp end and the plates to be welded. Further, the welding is performed under a shielding gas of an inert gas comprising at least 50% helium. The welding is accomplished with high efficiency and a sound welding bead having a bead width along the inner portion larger than the bead width along the surface of the bead, can be obtained.

2. Description of the Prior Art

Recently, various high efficiency welding processes have been proposed because of the increasing demand for welding structures from thick plate materials. However, most of these processes adopt the MIG (metal inert gas arc) welding technique in the weld butt joints of I-grooves or narrow V-grooves. In this technique, a small weaving motion within the welding groove, or two run multipass welding or control of the welding current is practically used in order to prevent the formation of defects such as the lack of fusion at both groove faces or at the boundaries of the respective welding passes. If these processes are used, welding defects often occur and the welding apparatus is very complicated. Thus, it has been difficult to practically apply these processes for welding which requires high quality. This is especially true for the welding of aluminum alloys which are widely used as low temperature materials for use in the transportation of LNG (liquefied natural gas) or in storage tanks for LNG. The materials which are welded are thick plates and therefore in order to weld these materials, high welding efficiency is desired in all welding positions and such a welding technique is urgently required.

In the fabrication of welding structures of aluminum alloys, many difficulties are encountered because of the physical and metallurgical properties of aluminum alloys in contrast to the fabrication of welding structure from ferrous materials.

Generally speaking, both TIG welding processes using non-consumable electrodes and MIG welding processes using consumable electrodes can be employed in the welding of aluminum alloys. Although TIG welding is far superior to MIG welding in arc stability and in the soundness of welds, a number of difficulties still remain with the TIG process. For instance, when TIG welding of aluminum alloys is done, an alternating welding current upon which a high frequency current is impressed is used. This is because if direct current is used with the electrode negative, it is impossible to clean the oxide film formed on the plate surface. On the other hand, if the electrode is positive, the electrode is apt to be consumed. Therefore, the welding current must be greatly decreased. If a high alternating current is used, the electrode can also be consumed. Thus, conventional TIG welding must be done with low electric currents and consequently efficient welding with deep penetration has not been attained.

In TIG welding using straight polarity, wherein the electrode is negative, and the plate is of positive polarity, deep penetration can be obtained and very little of the electrode is consumed. However, as mentioned above, cleaning of the oxide film cannot be expected, and consequently, puckering of the beads easily occurs. In attempts to overcome these problems, it has now been discovered that when the electrode has a round or flat end and it is positioned very close to the plates to be welded and excessive distribution of the arc is suppressed while the arc concentration in the central position of the arc column is prevented, and consequently the arc distribution on the plate is kept approximately the same as the cross sectional area of the electrode end, the molten pool is not agitated even if the welding current is high, the melting of the plate proceeds parallel to the arc column and the configuration of the weld metal cross section is such that the depth of penetration is sufficiently large relative to the bead width. Because of this effect, when a straight polarity is used, it is possible to conduct welding with a stable arc free from puckering of the plate and thus obtain deep penetration. Nevertheless, it is difficult to feed deposited metal into a groove having a certain width. Because cleaning of the oxide film normally cannot be expected in the situation when a current of straight polarity is applied, inclusion of the oxide film into the deposited metal and insufficient penetration between the deposited metal and the plates to be welded is apt to occur if the filler wire is fed into the welding region by the conventional TIG welding process. Further, because of the short arc length, it has been difficult to feed filler wire into the crater formed by the welding arc of short length.

On the other hand, the MIG welding process is inferior to the TIG welding process in arc stability and soundness of weld. But the MIG process has the advantage of being a faster welding process than the TIG process. In practice, MIG welding is used. However, it is indeed possible to use a high electric current in MIG welding compared to the currents used in TIG welding, but there is the disadvantage that deep penetration into the plates to be welded cannot be obtained even with high welding currents, especially in vertical welding, overhead welding and horizontal welding because of the particular characteristics of the aluminum alloy. In other words, because the melting point of pure aluminum is about 660° C while the melting point of iron is about 1530° C, and the density of aluminum is one-third that of iron, the amount of deposited metal when aluminum alloys are welded is much larger than the amount of metal deposited in the welding of iron with respect to equal welding currents. The large amount of deposited metal prevents the arc plasma from reaching the plate to be welded and consequently the base plate is not heated enough. Furthermore, the heat conductivity of aluminum is too high, and consequently, the heat input introduced into the welding zone is diffused therefrom which adversely affects the fusion of the base metal. If the welding current is increased, the amount of deposited metal is increased instead of increasing the penetration of the electrode into the plate to be welded, thus causing insufficient penetration and overlapping. Moreover, aluminum itself is a very reactive element, and thus perfect gas shielding is required to complete the welding process.

In view of these problems, the shape which the welding grooves can assume are limited, i.e., the angle of the Vee must be large enough when welding is accomplished by the MIG technique, which inevitably increases the cross-sectional area of the groove, thus requiring an increased amount of deposited metal. When aluminum alloys are welded, a wide weaving action of the electrode results in insufficient penetration into the alloy plate as well as adverse effects on the joint strength of the alloy because of the micro cracks which seem to occur as a result of eutectic melting of the aluminum alloy. Accordingly, a weaving motion of the electrode has been avoided. Accordingly, up to the present, welding has been accomplished as a straight bead or as a narrow bead resulting from limited weaving motion of the electrode. Because of all of the factors enumerated above, a high efficiency welding technique for the welding of thick aluminum and aluminum alloy members has not yet been developed.

As previously described, the conventional TIG and MIG welding processes present numerous difficulties. By reference to FIG. 1 it can be appreciated that in conventional welding the bead width at the surface of the base metal is large, while the bead width steadily narrows as the depths of the groove are reached. On the other hand, as shown in FIG. 2 for the narrow gap welding of aluminum alloys, filling metal is first deposited in the groove and then the groove is subjected to TIG welding. However, in this technique, the lower corners of the groove are not filled with metal and a fully fused junction is not achieved. In order to overcome this defect, the voltage or current can be increased to completely fuse all portions of the welding joint. But under these conditions, an undesirable undercut will form as shown in FIG. 3.

Although TIG welding with a straight polarity is widely known as described in "Welding Journal," May 1971, page 332–341, such TIG welding which is effected after insertion of the filling metal into the narrow groove between very thick plates is not described anywhere.

A technique is described in U.S. Pat. No. 3,825,712 which relates to narrow groove DCSP-TIG welding. In this technique much difficulty is encountered in placing the filling wire under the welding arc as described above especially for all position welding.

A need therefore continues to exist for a method of accomplishing the narrow butt welding of aluminum materials by a technique which overcomes the deficiencies of the conventional methods.

SUMMARY OF THE INVENTION

Accordingly, it is one object of the present invention to provide a process for the narrow gap welding of thick plates of aluminum and aluminum alloys by a high current TIG welding technique whereby a bead is obtained which has a larger width on the inner portions than on the surfaces of the grooves.

Another object of the present invention is to provide a high current TIG welding process whereby a sound weld of a base metal is obtained without defects such as micro cracks.

Briefly, these objects and other objects of the present invention as hereinafter will become more readily apparent can be attained by a process for the narrow gap welding of aluminum and aluminum alloy plates more than 20 mm thick which comprises the steps of inserting a filling material into a welding groove, applying a direct current of more than 300 amps between a non-consumable electrode which does not have a sharp end and said plates to be welded with a straight polarity, maintaining an arc length of 0.5 – 5 mm and blanketing the welding groove with a shielding gas comprising an inert gas of at least 50% helium.

In one aspect of the present invention, the welding process is modified by inserting a filling material into the welding groove by means of MIG welding and thereafter remelting the filling material by high current TIG welding. The filling material can be remelted a number of times. The welding process is modified by inserting the filling material into the welding groove by a mechanical means, and thereafter remelting the filling material by high current TIG welding.

In still another aspect of the present invention, the welding process is modified by conducting the TIG welding step under a dual shield comprising an inner and outer shielding means and at least an inner shielding gas of at least 50% helium.

In another aspect of the present invention, the welding process is performed on aluminum or aluminum alloy plates having welding grooves wherein the angle of the Vee is less than 30°. In yet another aspect of the present invention, the welding process is performed by filling the welding groove with a filling material having a thickness of 3 – 20 mm, and a maximum width of 1 – 3 times the diameter of the non-consumable electrode. In another aspect of the present invention, welding is accomplished by passing a consumable electrode in a straight direction. In still another aspect of the present invention, welding is accomplished by moving the non-consumable electrode in a weaving motion of an approximately rectangular configuration in the direction of travel of the electrode, wherein the weaving frequency is 10 – 100 cycles per minute and the width of the weaving motion is less than 10 mm. In yet another aspect of the present invention, welding is accomplished after filling by MIG welding with more than two non-consumable electrodes where the distance between a preceding electrode and a following electrode is 30 – 200 mm. In another aspect of the present invention, welding is accomplished after filling by MIG welding by more than two non-consumable electrodes wherein the period from the time when a preceding electrode passes through a certain point in the welding path to the time when a following electrode passes through the same point is 4 – 60 seconds. In yet another aspect of the present invention, welding is accomplished after filling by MIG welding wherein the portion of the groove where good fusion is not obtained by the MIG welding is welded by high current TIG welding to achieve deep penetration of the poorly fused area. In still another aspect of the present invention, welding is accomplished vertically or vertically in an inclined position. In yet another aspect of the present invention, welding is accomplished by downwardly manipulating the advancing non-consumable electrode when welding vertically or vertically in an inclined position. In another aspect of the present invention, welding is accomplished by conducting the MIG welding step upwardly followed by conducting the TIG welding downwardly when welding vertically or welding vertically in an inclined position. In yet another aspect of the present invention, welding is accomplished by conducting the MIG welding step upwardly followed by conducting the TIG welding upwardly when welding vertically or vertically in an inclined position. In still another aspect of the present invention, welding is accomplished horizontally or horizontally in an inclined position. In yet another apsect of the present invention, welding is accomplished horizontally or horizontally in an inclined position after filling by MIG welding.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
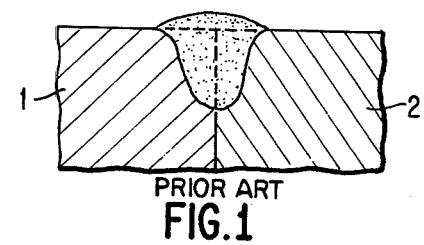
FIGS. 1, 2(a), 2(b), 3(a), 3(b) are cross-sectional views welding beads as deposited by conventional welding processes.
Figure 2A:
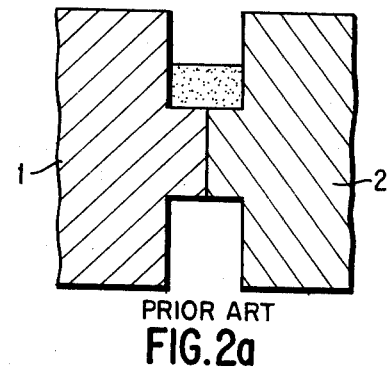
Figure 2B:
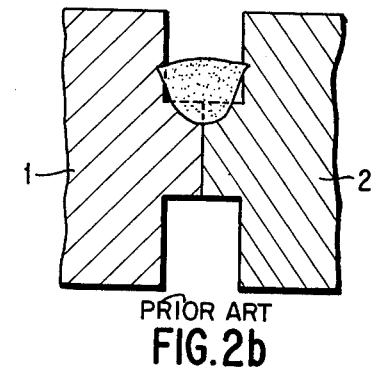
Figure 3A:
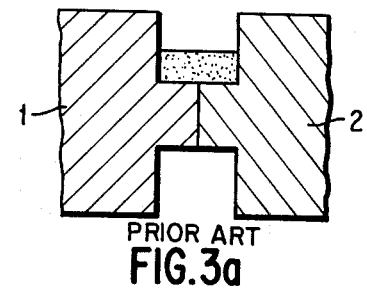
Figure 3B:
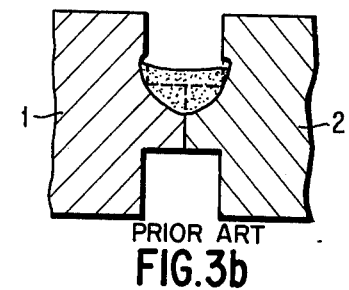
Figure 4:
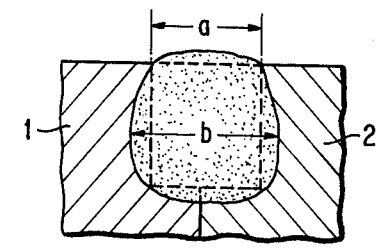
FIG. 4 is a cross-sectional view of a welding bead as deposited by the process of the present invention.

In the process of the present invention, a welding bead is formed which has a bead width ($a$) on the inner portion of the groove wider than the bead width ($b$) on the surface of the groove as shown in FIG. 4. By the present process, high efficiency welding with deep penetration into the aluminum or aluminum alloy plates in narrow gap welding of the thick plates can be accomplished.

Figure 5A:
FIG. 5(a) is a cross-sectional view of the non-consumable electrodes used in conventional TIG welding.
Figure 5B:
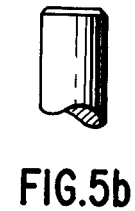
FIGS. 5(b) and 5(c) are cross-sectional views of the non-consumable electrodes used in the present invention.
Figure 5C:
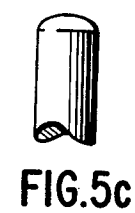

In order to obtain stable deep penetration, it is desirable that the current density of the electrode be kept within the range of 10 – 50 A/mm$^2$. Below 10 A/mm$^2$, sufficiently deep penetration relative to the width of the bead cannot be obtained and the welding arc is apt to be unstable. At a current density over 50 A/mm$^2$, the force of the arc becomes too strong to maintain the flat surface of the molten pool and the molten metal drops or flows from the welding area, especially in the case of vertical and horizontal welding. Accordingly, a conventional TIG electrode which has a sharp top end portion as shown in FIG. 5(a) causes the arc to concentrate, which is undesirable in the present invention. It is therefore necessary that the end of the TIG welding electrode should be flat or a round configuration as shown in FIGS. 5(b) and 5(c).

A direct current greater than 300 amps with straight polarity (electrode negative and plate positive) is used in the present invention. It is essential that the non-consumable electrode should be kept close to the plates to be welded. That is to say, the area of the plates where the force of the arc is applied should be approximately equal to the cross-sectional area of the non-consumable electrode. In this situation, extremely good welding results can be obtained which cannot be obtained by the conventional welding processes.

It is believed that the surface area of the molten pool is small because of the short length of the welding arc, and the occurrence of oxide film inclusions into the deposited metal can be suppressed in spite of the fact that little cleaning occurs in the groove. As a result, deep penetration into the plates can be obtained. In view of the above considerations, the arc length should be 0.5 – 5 mm.

In accordance with the present process, if the polarity of the non-consumable electrode is negative, as mentioned above, very little of the electrode is consumed. Consequently, high welding current can be applied and substantial penetration into the plates can be obtained. If the welding current is less than 300 amps, deep penetration cannot be obtained because of insufficient heat input. On the other hand, if the welding current is over 2000 A when welding in vertical and horizontal positions or vertical welding in an inclined position, the force of the arc becomes too strong and thus it is impossible to prevent the molten metal from dropping down from the welding zone and it is also impossible to achieve the basic object of the present invention, i.e., to obtain a sound weld and deep penetration.

Figure 10:
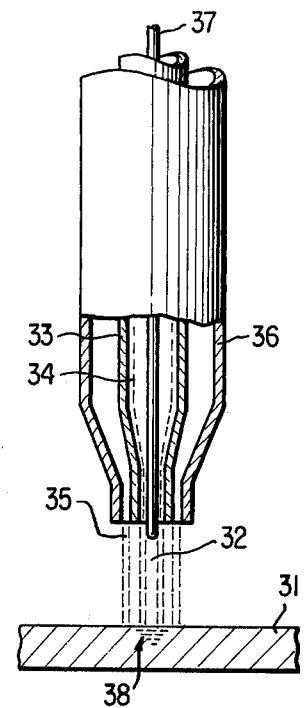
FIG. 10 illustrates the use of dual shielding in the welding process of the present invention.

The penetration depth is largely affected by the composition of shielding gas. It has been found through various experiments that an inert gas comprising at least 50% helium is required in the present process. If an inert gas containing less than 50% helium is used as the shielding gas, the width of the resulting bead cannot be wide even though the welding current is increased and the depth of penetration is not very great. When a dual shielding technique is adopted, at least the inner shielding gas may satisfy the above limitation, and the outer shielding gas may have an optional composition. Furthermore, in order to obtain the desired results, it is preferred that the specific gravity of the outer shielding gas be greater than that of the inner shielding gas. FIG. 10 illustrates the dual gas shielding technique. The welding arc 32 from welding electrode 37 is shielded by an inner shielding gas flow 34 through nozzle 33 and an outer shielding gas flow 35 through nozzle 36, to weld plate 31 with weld filler 38.

Figure 6A:
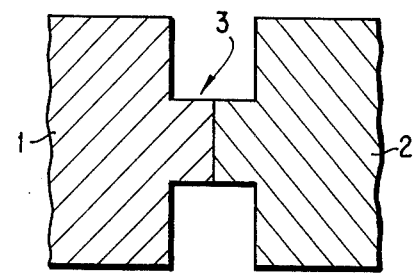
FIGS. 6(a), 6(b), 6(c) and 6(d) are explanatory cross-sectional views of the present process.
Figure 6B:
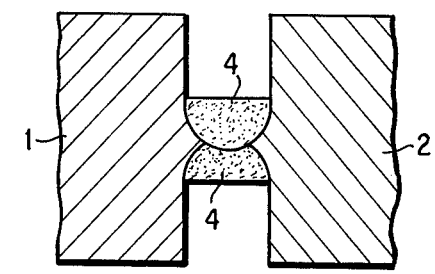
Figure 6C:
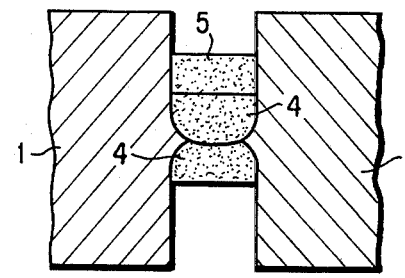
Figure 6D:
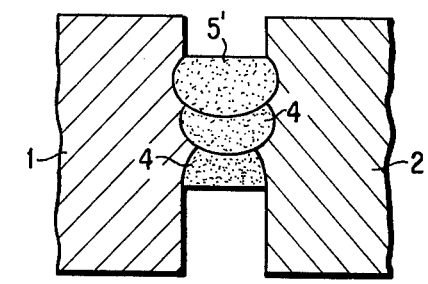

Reference is made to FIG. 6 where an example of the present invention is described as shown in FIG. 6(a). The welding groove 3 is formed between plates 1 and 2. Initially, TIG welding is accomplished in one pass at high currents with straight polarity on both sides of the groove without inserting filling material into the groove. In this TIG welding technique, deep penetration into the plates' center is obtained, as shown in FIG. 6(b). Thereafter, a filling material (filler metal) 5 is driven into the groove involving the surface of the deposited metal 4 formed by the preceding high current TIG welding step and the plates' surfaces by mechanical means. In this case, if there is a crater or curved portion on the deposited metal 4, the filling material is formed to fit the groove by using an elastic filling material or by preheating the filling material before inserting it into the groove. Deposited metal 5' is formed on the second layer as shown in FIG. 6(d) by TIG welding of inserted filling material 5. This welding is repeated on both sides and a complete welding joint is obtained. In this example, three passes are made on each side.

Having generally described this invention, a further understanding can be obtained by reference to certain specific examples which are provided herein for purposes of illustration only and are not intended to be limiting unless otherwise specified.

EXAMPLE 1

Welding Conditions

Plates: JIS H 4000 (1970) A5083-0 aluminum alloy, 60 mm in thickness
Groove Shape: Square H-type as shown in FIG. 6(a), root face of 20 mm, groove width of 10 mm
Filling Material: JIS H 4000 (1970) A5083-0 aluminum alloy 10 mm width, 10 mm thickness, 500 mm length; driven into the groove with a hammer by manpower after preheating to 300° C
Welding Current: 600 A direct current, straight polarity (electrode negative)
Welding Voltage: 12 V
Welding Speed: 5 cm/min
Electrode: tungsten electrode containing thorium, 6.4 mm diameter
Shielding Gas: pure helium gas, 40 liter/min After one pass of a high current, TIG welding is accomplished on both sides of the welding groove under the above specified welding conditions. High current TIG welding under the above condition is repeated twice with the inserted filling material on each side of the groove. As a result, sufficiently deep and wide penetration and good mechanical properties of the welded alloy were obtained. A good side bend test result of 180° is also obtained.

EXAMPLE 2

Welding Conditions

Plates: JIS H 4000 (1970) 7N01-T4, aluminum alloy plates 40 mm thick
Groove Shape: square H-type as shown in FIG. 6(a), root face of 20 mm, 15 mm in width
Filling Material: JIS H 4000 (1970) A5005 aluminum alloy - 10 mm thickness, 15 mm width; pure zinc 0.5 mm is plated on the aluminum alloy to a thickness of 0.5 mm and a width of 15 mm. The filling material is driven into the groove by manpower without preheating.
Welding Current: 500A D.C. straight polarity
Voltage: Volage: 13 V
Welding Speed: 6 cm/min
Weaving Width: 5 mm
Shielding Gas: dual shielding, inner shielding gas: pure helium 30 liter/min. outer shielding gas: pure argon 30 liter/min In the first pass, high current TIG welding is accomplished without filling material under the above welding conditions. Thereafter, high current TIG welding under the above conditions is accomplished with a filling material inserted into the groove with one pass on each side.

As a result, sufficient penetration and good mechanical properties were obtained.

The filling material used in the present invention is as follows. According to the mechanical properties of the weld, quality can be optionally selected. For example, if the plates to be welded are JIS H 4000 (1970) A5083-0 aluminum alloys, the same quality material or JIS Z 3232 (1970) A5183 alloy can be used as the filling material. In most cases, the filling material should have the same composition as the plates to be welded.

It is desired that the shape of the filling material be square. However, both round or oval shaped materials can be used. The strength of the filling material should be about 10 kg/mm$^2$. In the case of JIS H 4000 (1970) A5083-0 aluminum alloys having a strength of 30 kg/mm$^2$ at room temperature, it is difficult to drive the material into the welding groove. Accordingly, it is necessary to preheat the material to about 300° C by flame heating or induction heating before driving it into the groove.

The filling materials can be driven into the grooves even if they are square, round or oval shape, so as to fit the groove. However, in order to completely conform the filling material to the groove, the following examples of filling material can be used.

Figure 7A:
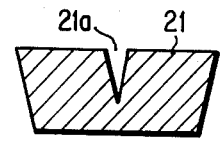
FIGS. 7(a), 7(b), 7(c), 7(d), 7(e), 7(f) and 7(g) are examples of filling materials which have characteristic shapes adaptable to the welding process of the present invention.

FIGS. 7(a) – 7(g) show filling materials of different shapes. FIG. 7(a) shows a filling material which tapers inward along the sides from the top and has a V-slit 21a on the upper central portion. When inserted into a welding groove, slit 21a readily closes resulting in easy insertion of the filling material. Even if the groove is a little rough, tight contact between the surfaces of the filling material and the groove can be obtained because of the elasticity of the filling material.

Figure 7B:
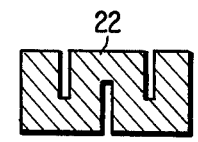

FIG. 7(b) shows a filling material 22 which has two slits on the upper side and one slit on the lower central portion to achieve the same effects as the above mentioned material 21.

Figure 7C:
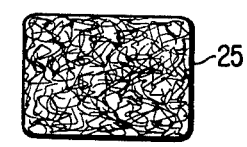

FIG. 7(c) shows a filling material 25 consisting of a fibrous filler and an aluminum foil about the firrous filler. The filler must be kept away from water or organic materials such as oil. Because the fibrous material is wrapped with aluminum foil, the material can be uniformly contacted with the welding groove regardless of the dimension or shape of the groove.

Figure 7D:
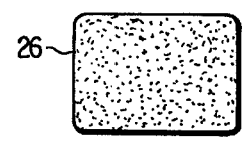

FIG. 7(d) shows a filling material 26 which has the same effect as the material 25. A powdery or granular filler is wrapped with aluminum foil.

Figure 7E:
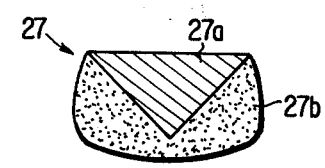

FIG. 7(e) shows a filling material 27 which consists of solid filler 27a and a fibrous or powdery filler 27b and aluminum foil wrapping fillers 27a and 27b. The solid filler 27a has an inverse triangular shaped cross-section so that the effects of the driving forces are uniformly distributed around the fibrous filler when the material 27 is driven into the welding groove. In this case, fillers 27a and 27b are combined, but they can be separated and after inserting the fibrous filler, the solid filler may be driven onto the fibrous filler.

Figure 7F:
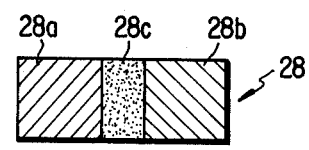

FIG. 7(f) shows a filling material 28 having two solid fillers 28a and 28b and a powdery filler 28c positioned therebetween. Filler 28c may be granular or fibrous. When inserting this material, the width of the filling material can be reduced and easy insertion can be achieved.

When filling materials 27 or 28 are inserted, the driving force can be uniformly applied to the powdery filler. Consequently, easy insertion and good contact between the filling material and the plates to be welded can be obtained.

Figure 7G:
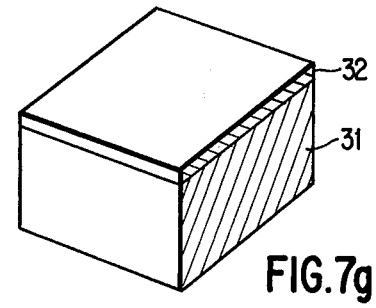

When welding JIS H 4000 (1970) A5083 aluminum alloys, the filling materials as shown in FIG. 7(g) which consist of pure aluminum 31 and pure magnesium 32, which does not have high strength, plates on the pure aluminum 31 can be used. This material is not hard as a whole, but its chemical composition should be the same or approximately the same as the plate to be welded, which is essential to obtain a deposited metal having equal properties with those of the plate.

Besides the above process wherein the filling material is inserted into the welding groove by mechanical means, it is proposed that molten metal be inserted into the welding groove and thereafter high current TIG welding be performed. Indeed, insertion by mechanical means can only be used when the welding groove is even throughout the welding line. Practically, however, some roughness of the welding groove can be expected which often occurs. In these cases, insertion of the filling material with molten metal by MIG welding is very useful.

Figure 8A:
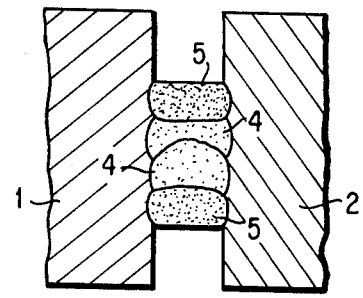
FIGS. 8(a) and 8(b) are explanatory cross-sectional views of the welding process of the present invention.
Figure 8B:
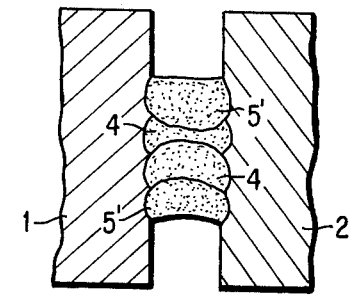

As shown in FIG. 8(a), molten metal 5 is inserted into the welding groove. Then, as shown in FIG. 8(b), the inserted metal 5 is welded by high current TIG welding to form welds 5'. Also, more metal can be inserted by MIG welding as shown in FIG. 8(a) followed by welding by high current TIG welding as shown in FIG. 8(b). This sequence of steps can be repeated a certain number of times to complete welding. In this case, a root face is provided from the beginning, but the same effect can be achieved by MIG welding or other welding techniques as provided by the root face.

The present process is restricted to plate thicknesses of more than 20 mm, because, if the thickness is less than 20 mm, the plate itself will be welded without insertion. According to the present invention, plate thicknesses from 20 mm to 10 mm can be welded. Suitable shapes of the welding groove include I-types, V-types, U-types, H-types and X-types. However, for all groove shapes, the angle formed by two lines of the extended groove faces must be less than 30°, because if the angle is over 30°, the gap of the groove surface is too large and high efficiency welding cannot be achieved.

The thickness of the filling material should be 3 – 20 mm, and the maximum width thereof should be 1 – 3 times that of the non-consumable electrode diameter. If the thickness of the filling material is over 20 mm, the filling material itself cannot be thoroughly fused by the high current TIG welding and welding stability is adversely affected. On the other hand, if the thickness is less than 3 mm, one of the objects of the present invention, i.e., high efficiency welding, cannot be achieved. If the width of the filling materials, namely the groove width, is over 3 times the electrode diameter, the complete width of the filling material is not thoroughly melted by the subsequent high current TIG welding. On the other hand, if the width of the filling material is narrower than the electrode diameter, the electrode is inclined to contact the plates to be welded, and consequently, suitable welding of the thick plate is not obtained. However, in high current TIG welding, if the electrode tip is moved in a weaving motion, the limitations concerning the width of the filling material are no longer applicable.

In high current welding where the inserted metal is remelted, the direction of the non-consumable electrode should approximately define a rectangular configuration in the proceeding direction of the welding. Especially in case of wide welding grooves, a weaving method in the direction of the groove thickness promotes sufficient remelting of the filling material.

Concerning the weaving speed, if it is too slow, melting of the filling material is not uniform and insufficient penetration will occur. On the other hand, if it is too fast, the welding workability is bad and welding defects will occur. Accordingly, the weaving speed should be in the range of 10 – 100 cycles per minute. The width of the weaving motion should be less than 10 mm. If over 10 mm, micro cracks which occur especially in the welding of aluminum and aluminum alloys, will occur and the welding efficiency will be poor.

Figure 11:
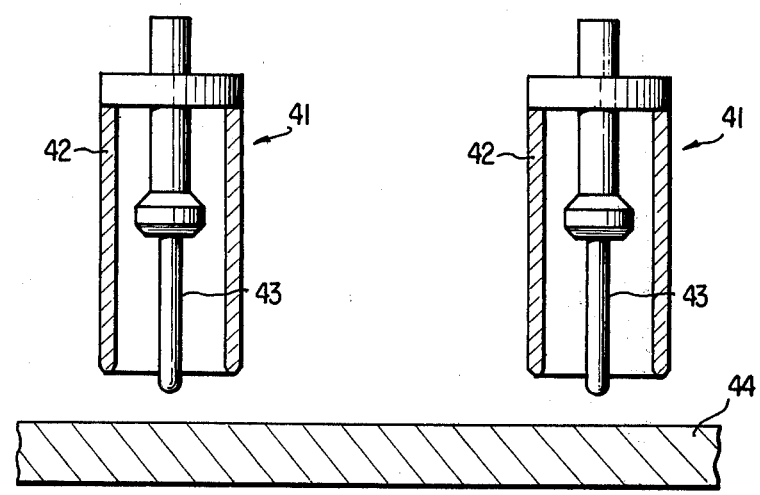
FIG. 11 illustrates the use of two non-consumable welding electrodes in the process of the present invention.

When more than two non-consumable electrodes are used in the high current TIG welding, the distance between a preceding electrode and the following electrode should be 30–200 mm. If the distance is less than 30 mm, the molten metal will drop or fall from the groove because the molten metal heated by the preceding electrode has not sufficiently cooled before it is subjected to the heat of the following electrode. At distances in excess of 200 mm, the molten metal cools too greatly which prevents high efficiency welding. In view of the factors discussed above, the period between the time when the preceding electrode passes through a certain point of the welding line, and the time when the following electrode passes through the same point should be 4 – 60 seconds. FIG. 11 illustrates this embodiment. The welding torches 41 are mounted facing the workpiece. The welding electrodes 43 is coaxially mounted in a housing 42 through which an inert gas is directed at the workpiece. The distance between the welding electrodes is chosen such that the preceding requirements are satisfied.

Figure 9A:
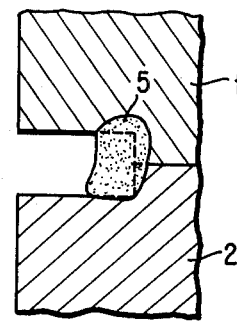
FIGS. 9(a), 9(b) is a cross-sectional view of the welding process of the present invention.
Figure 9B:
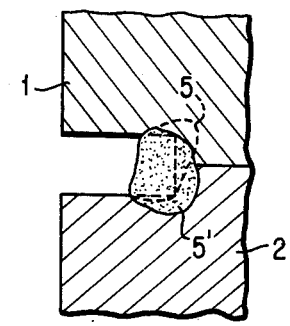

In view of the characteristics of MIG welding, when a filling material is inserted into the groove as shown in FIG. 9(a), the upper portion of the groove is comparatively well fused, but the lower portion is insufficiently fused. In this case, as shown in FIG. 9(b), high current TIG welding is applied mainly to the lower portion of the groove. This is effective especially for welding in a horizontal position or a horizontal position in an inclined direction. In FIGS. 9(a) and 9(b), the welding bead formed by MIG welding is 5, and the welding bead formed by high current TIG welding is 5'.

According to the high current TIG welding process of the present invention, the surface of the molten metal is small. Accordingly, the present process can be applied to vertical welding and horizontal welding as well as flat welding. Also, vertical welding in an inclined direction or welding in the horizontal position in an inclined direction can be accomplished by the present process.

When high current TIG welding is performed by the present process, the non-consumable electrode is preferably passed along the welding line downwardly in vertical welding or vertical welding in an inclined direction. The strong arc force of the non-consumable electrode supports the molten metal and prevents the molten metal from dropping from the welding zone. Also, moving the non-consumable electrode in this manner serves to keep the welding condition stable. Accordingly, if a filling material is inserted by mechanical means, it is essential that the non-consumable electrode be passed downwardly. On the other hand, when the filling material is inserted by MIG welding, the non-consumable electrode may be passed upwardly because the filling material is tightly fixed within the groove by the MIG welding step. While MIG welding is preferably performed upwardly, if the MIG welding is performed downwardly, the molten metal tends to drop from the welding zone because of the force of gravity of the molten metal itself and the arc force of MIG welding. Generally speaking, the welding current in the MIG welding step is low compared to that of the TIG welding step. Therefore, it is impossible to support the molten metal in the MIG welding step in a vertical or inclined vertical position.

As is apparent from the foregoing, the present invention provides a process for the narrow gap welding of aluminum and aluminum alloy thick plates with improved high efficiency and provides sound welds which the conventional processes fail to achieve.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A process for the narrow gap welding of aluminum and aluminum alloy plates greater than 20 mm in thickness with a non-consumable electrode, which comprises the steps of:
    first inserting the filling material into the welding groove, and then applying a direct current of more than 300 A between said non-consumable electrode which is characterized by a flat welding end configuration and a current density of 10–50 A/mm$^2$ and said plates to be welded with straight polarity,
    maintaining arc length from 0.5 to 5 mm during said welding; and
    shielding the welding groove with an inert gas comprising at least 50% helium.

2. The welding process of claim 1, wherein said filling material is inserted into said welding groove by MIG welding.

3. The welding process of claim 2, which further comprises: remelting said filling material a number of times by repetitive passes of said electrode by TIG welding.

4. The process of claim 2, wherein said welding is accomplished with more than two non-consumable electrodes and the distance between a preceding electrode and a following electrode is 30 – 200 mm.

5. The process of claim 2, wherein said welding is accomplished with more than two non-consumable electrodes and the period between the time when a preceding electrode passes through a certain point in the welding line and the time when a following electrode passes through the same point is 4 – 60 sec.

6. The process of claim 2, wherein said MIG welding is performed upwardly and said TIG welding is performed downwardly when welding vertically.

7. The process of claim 6, wherein said vertical welding is accomplished in an inclined position.

8. The process of claim 2, wherein said MIG welding is performed upwardly and said TIG welding is performed upwardly when welding vertically.

9. The process of claim 8, wherein said vertical welding is accomplished in an inclined position.

10. The process of claim 2, wherein said welding is accomplished horizontally.

11. The process of claim 2, wherein said welding is accomplished horizontally in an inclined position.

12. The welding process of claim 1, wherein said filling material is inserted by mechanical means.

13. The welding process of claim 1, wherein said shielding is accomplished by dual shielding by an inner and outer shielding gas wherein at least the inner shielding gas comprises at least 50% helium during TIG welding.

14. The welding process of claim 1, wherein the angle formed by the two extended lines of the faces of said groove in the aluminum or aluminum alloy plates is less than 30°.

15. The welding process of claim 1, wherein said filling material has a thickness of 3 – 20 mm and a maximum width of 1 – 3 times the diameter of the non-consumable electrode.

16. The process of claim 1, wherein said non-consumable electrode is moved in a straight line.

17. The process of claim 1, wherein said non-consumable electrode passes in a weaving motion in approximately a rectangular configuration relative to the direction of travel of the welding electrode through said groove.

18. The process of claim 17, wherein the frequency of weaving is 10 – 100 cycles per minute.

19. The process of claim 18, wherein the width of said weaving motion is less than 10 mm.

20. The process of claim 1, wherein said welding is accomplished in a vertical position.

21. The process of claim 1, wherein vertical welding is accomplished in an inclined position.

22. The process of claim 1, wherein said non-consumable electrode is manipulated downwards when welding vertically.

23. The process of claim 1, wherein said non-consumable electrode is manipulated downwards when welding vertically in an inclined position.

24. The process of claim 1, wherein said welding is accomplished horizontally.

25. The process of claim 1, wherein said welding is accomplished horizontally in an inclined position.

26. A process for the narrow gap welding of aluminum and aluminum alloy plates greater than 20 mm in thickness with a non-consumable electrode, which comprises the steps of:
    first inserting the filling material into the welding groove, and then applying a direct current of more than 300 A between said non-consumable electrode which is characterized by a round welding end configuration and a current density of 10–50 A/mm$^2$ and said plates to be welded with straight polarity,
    maintaining arc length from 0.5 to 5 mm during said welding; and
    shielding the welding groove with an inert gas comprising at least 50% helium.

27. The welding process of claim 26, wherein said filling material is inserted into said welding groove by MIG welding.

* * * * *